(12) United States Patent
Goodnow et al.

(10) Patent No.: US 7,512,813 B2
(45) Date of Patent: Mar. 31, 2009

(54) METHOD FOR SYSTEM LEVEL PROTECTION OF FIELD PROGRAMMABLE LOGIC DEVICES

(75) Inventors: Kenneth J. Goodnow, Essex Junction, VT (US); Clarence R. Ogilvie, Huntington, VT (US); Christopher B. Reynolds, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 10/709,809

(22) Filed: May 28, 2004

(65) Prior Publication Data

US 2005/0278551 A1    Dec. 15, 2005

(51) Int. Cl.
*G06F 9/00* (2006.01)
*G06F 15/177* (2006.01)
*G06F 12/14* (2006.01)
*G06F 13/16* (2006.01)
*G06F 13/36* (2006.01)
*H04L 9/14* (2006.01)
*G06F 12/16* (2006.01)
*H04L 9/20* (2006.01)
*H04K 1/00* (2006.01)

(52) U.S. Cl. .......................... 713/193; 713/2; 713/194; 380/42; 710/108; 710/200; 726/27

(58) Field of Classification Search ................. 713/193, 713/194, 2; 726/27; 380/42; 710/108, 200
See application file for complete search history.

(56) References Cited

U.S. PATENT DOCUMENTS

| | | | | |
|---|---|---|---|---|
| 4,633,392 A | * | 12/1986 | Vincent et al. | 710/104 |
| 4,888,802 A | * | 12/1989 | Cooney | 380/277 |
| 5,175,829 A | * | 12/1992 | Stumpf et al. | 712/203 |
| 5,557,743 A | * | 9/1996 | Pombo et al. | 726/23 |
| 6,212,639 B1 | * | 4/2001 | Erickson et al. | 726/26 |
| 6,230,307 B1 | | 5/2001 | Davis et al. | |
| 6,785,816 B1 | * | 8/2004 | Kivimaki et al. | 713/181 |
| 7,127,616 B2 | * | 10/2006 | Kaneko | 713/191 |
| 7,343,483 B1 | * | 3/2008 | May et al. | 713/1 |
| 7,366,306 B1 | * | 4/2008 | Trimberger | 380/278 |

OTHER PUBLICATIONS

Menezes, Alfred J. et al. Handbook of Applied Cryptography, 1997 CRC Press, LLC, p. 547.*

* cited by examiner

*Primary Examiner*—Michael J Simitoski
(74) *Attorney, Agent, or Firm*—Cantor Colburn LLP; Michael LeStrange

(57) ABSTRACT

A method for protecting a dynamically reconfigurable computing system includes generating an encoding key and passing the encoding key, through a system level bus, to at least one field programmable logic device and to a function library included within the system. The function library contains a plurality of functions for selective programming into the at least one field programmable logic device. A lock is generated so as to prevent external resources with respect to the system from accessing the encoding key during the passing thereof.

4 Claims, 6 Drawing Sheets

METHOD FOR SYSTEM LEVEL PROTECTION OF FIELD PROGRAMMABLE LOGIC DEVICES

BACKGROUND OF INVENTION

The present invention relates generally to dynamically reconfigurable hardware and computing systems, and, more particularly, to a method for system level protection of field programmable logic devices.

The development and execution of processing algorithms may be classified under two broad categories of implementation: software and hardware. An algorithm implemented in software utilizes a set of general purpose instructions that provide a high degree of flexibility in implementing a wide variety of processing tasks. However, a processor used in such software implementations has a fixed architecture, and the overhead associated with supporting its large number of general purpose instructions decreases overall performance. An algorithm implemented in hardware, on the other hand, such as an application specific integrated circuit (ASIC), is optimized for a single or limited number of processing task(s) and is dedicated to those tasks. While such hardware implementations can provide a higher performance solution, they also have the disadvantages of lower flexibility and longer time to market.

Traditional software implementations provide many advantages to the developer, including reusable processing platforms that can perform many tasks and an iterative design approach. However, these advantages come at the expense of performance. Such traditional software implementations work on an instruction basis, which limits throughput. Moreover, they suffer due to their very limited form of parallelism, a lack of dynamic reconfigurability. Microprocessor architectures used with such software implementations are not well suited for efficiently dealing with many applications that require concurrent processing, such as multimedia data and processing network protocols.

Traditional hardware implementations are optimized to provide efficient processing of a single (or a limited number of) algorithm(s). This provides a high level of performance, but since the hardware is fixed, there is limited reuse of the processing platform and the development platform does not allow for iterative development because changes to the hardware are costly and time consuming.

Since the early 1980's, field programmable gate arrays (FPGAs) have been used to provide a partial solution to the limitations encountered in traditional software and hardware implementations. FPGAs are computing devices that can implement virtually any digital circuit in hardware. In addition, many of them can be reconfigured simply by loading them with a different "hardware" program. This allows them to implement many processing algorithms with performance that approaches that of dedicated hardware while retaining the flexibility to dynamically reconfigure the implementation when necessary. This hybrid technology of reprogrammable hardware can provide many of the advantages of both hardware and software.

However, since Programmable Logic Structures (PLS), such as FPGAs, have become more pervasive as reprogrammable logic sources on larger, system-on-chip (SOC) structures, the programming of a PLS may become susceptible to subversion by programming for uses not intended by the designer of the system. In particular, a PLS may be vulnerable to a software virus type of attack. Because a PLS may define a function that, in turn, controls an outside function (e.g., motor control of a manufacturing robot), the security of the PLS can become a serious concern in designing a PLS in an SOC.

The art of using a library to store multiple functions that can then be transported across a system bus and subsequently programmed into a PLS is known in the art, as disclosed for example in U.S. Pat. No. 6,230,307 to Davis, et al. Accordingly, given such a system architecture, it becomes desirable to be able to allow only correct programming information to be written into the PLS.

SUMMARY OF INVENTION

The foregoing discussed drawbacks and deficiencies of the prior art are overcome or alleviated by a method for protecting a dynamically reconfigurable computing system. In an exemplary embodiment, the method includes generating an encoding key and passing the encoding key, through a system level bus, to at least one field programmable logic device and to a function library included within the system. The function library contains a plurality of functions for selective programming into the least one field programmable logic device. A lock is generated so as to prevent external resources with respect to the system from accessing the encoding key during the passing thereof In another embodiment, a dynamically reconfigurable programmable logic system includes at least one field programmable logic device and a function library containing a plurality of functions for selective programming into the at least one field programmable logic device. A signature/lock generator is configured for generating an encoding key, and a system level bus is in communication with the at least one field programmable logic device, the function library and the signature/lock generator. The system level bus is configured to pass the encoding key from the signature/lock generator to the at least one field programmable logic device and the function library. The signature/lock generator further is configured to generate a lock so as to prevent external resources with respect to the system from accessing the encoding key during the passing thereof In still another embodiment, a dynamically reconfigurable programmable logic system includes a first system on a chip (SOC), the first SOC including a first plurality of field programmable logic devices. A first function library contains a plurality of functions for selective programming into the first plurality of field programmable logic devices. A first signature/lock generator is configured for generating an encoding key associated with the first SOC, and a system level bus is in communication with the first plurality of field programmable logic devices, the first function library and the first signature/lock generator. The system level bus is configured to pass the encoding key associated with the first SOC, from the signature/lock generator to the first plurality of field programmable logic devices and the first function library. The first signature/lock generator further is configured to generate a lock during a power-on reset of said first SOC so as to prevent external resources with respect to the first SOC from accessing the encoding key associated with the first SOC during the passing thereof

BRIEF DESCRIPTION OF DRAWINGS

Referring to the exemplary drawings wherein like elements are numbered alike in the several Figures.

DETAILED DESCRIPTION

An inherent problem associated with using a programmable logic structure as a reprogrammable function block is how to ascertain that only valid design information is placed into the PLS. This problem may be viewed in terms of the actual programming of the PLS, the secure transmission of the programming data across a system level bus, and secure storage of the programming data.

Figure 1:
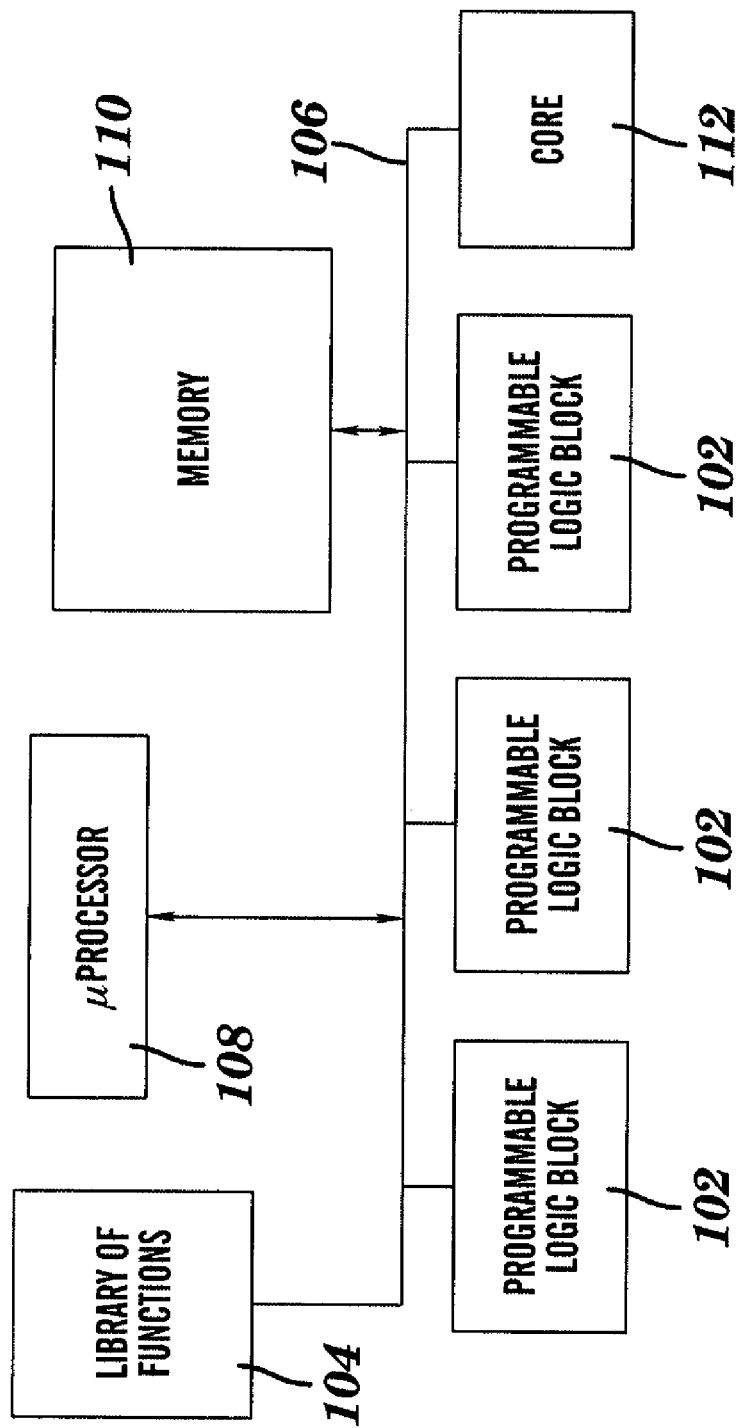
FIG. 1 is a block diagram of an existing system on a chip (SOC), having one or more programmable logic blocks associated therewith.

Referring initially to FIG. 1, there is shown a block diagram of an existing system on a chip (SOC) 100, having one or more programmable logic blocks (PLB) 102 associated therewith. The system 100 also includes a function library 104 for storing therein each of the different types of functions available for selective programming into the one or more programmable logic blocks 102. The programmable logic blocks 102 are accessible by the function library 104 through a system level bus 106. Other devices, such as microprocessor 108, memory 110 and core 112 may also have access to the system level bus 106.

Figure 2:
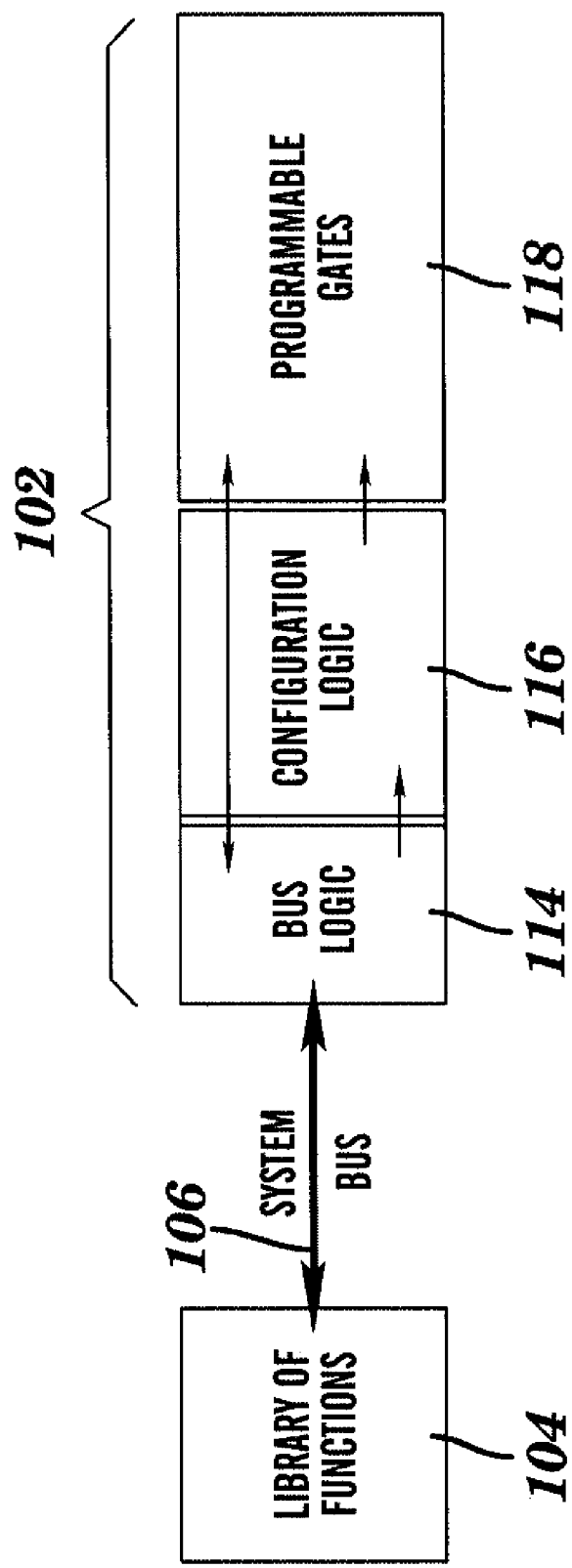
FIG. 2 is a block diagram illustrating in further detail a programmable logic block of FIG. 1.

During a "functional" mode, the microprocessor 108 instructs the function library 104 to transmit a new configuration to a particular programmable logic block 102. As illustrated more particularly in FIG. 2, the configuration information is passed from the function library 104 across the system bus 106, and is received by bus logic 114 that converts the data on the system bus 106 to useable data for configuration logic 116. The configuration logic 116, also included within the programmable logic block 102, is used to reconfigure the individual programmable gates 118 of the PLB 102 to achieve a particular function.

Figure 3:
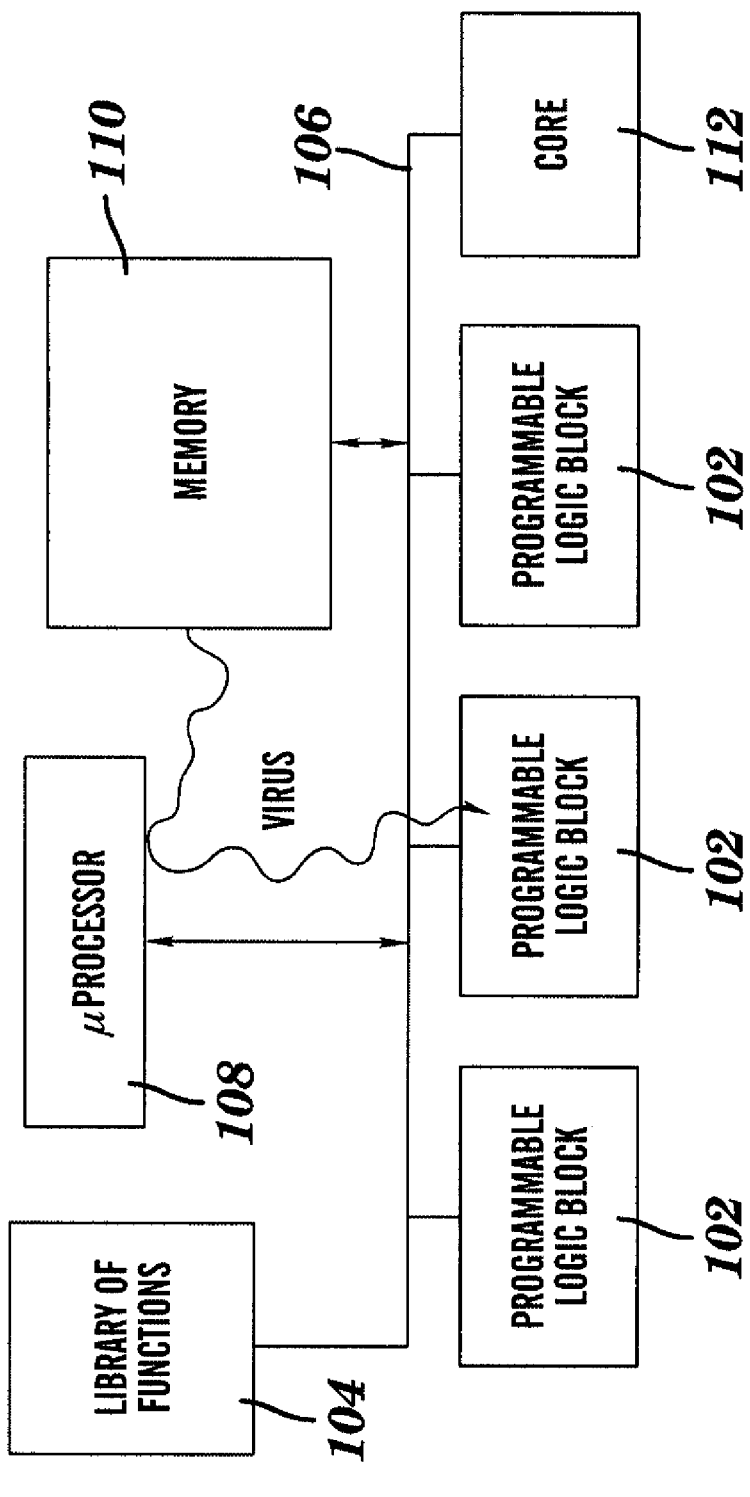
FIG. 3 is a block diagram depicting the susceptibility of the system of FIG. 1 to corrupting of one or more programmable logic blocks with bad programming data that may be introduced in the form of a virus.

However, a significant problem associated with system 100 (in terms of the above described method of downloading the configuration data) is that it is possible that corruption of the processor code itself will allow a deliberate "bad" write of a programmable logic block 102 (i.e., a virus may corrupt the programming of one or more PLBs). This is schematically represented in FIG. 3.

Moreover, if the system bus 106 is accessible to the external (i.e., "off-chip") network/world, it is possible that such a "bad" configuration could be provided by outside agents. Accordingly, finding a way to protect the PLB configuration data (so that only "valid" sources of configuration information are used) becomes problematic. One possible solution could be to create a second set of system buses, in addition to arbitrators for allowing a direct connection between the library and the programmable logic block. While such an approach might be acceptable for simple systems, the use of a separate bus structure for complex system becomes prohibitive, as a result of the additional wiring resources needed to achieve such a function.

Therefore, in accordance with an embodiment of the invention, there is disclosed a method for system level protection of field programmable logic devices. Briefly stated, the method incorporates encoded transmissions across a system level bus and decodes the encrypted transmissions at the programmable logic structures (PLS) through the use of encryption keys. The encryption keys are generated at system power-up and are transmitted across the system to the library and the PLS before any outside interference is possible. Furthermore, the encryption keys are written into write-once registers that cannot be viewed from the system level bus or any other structure except the encoding logic.

Figure 4:
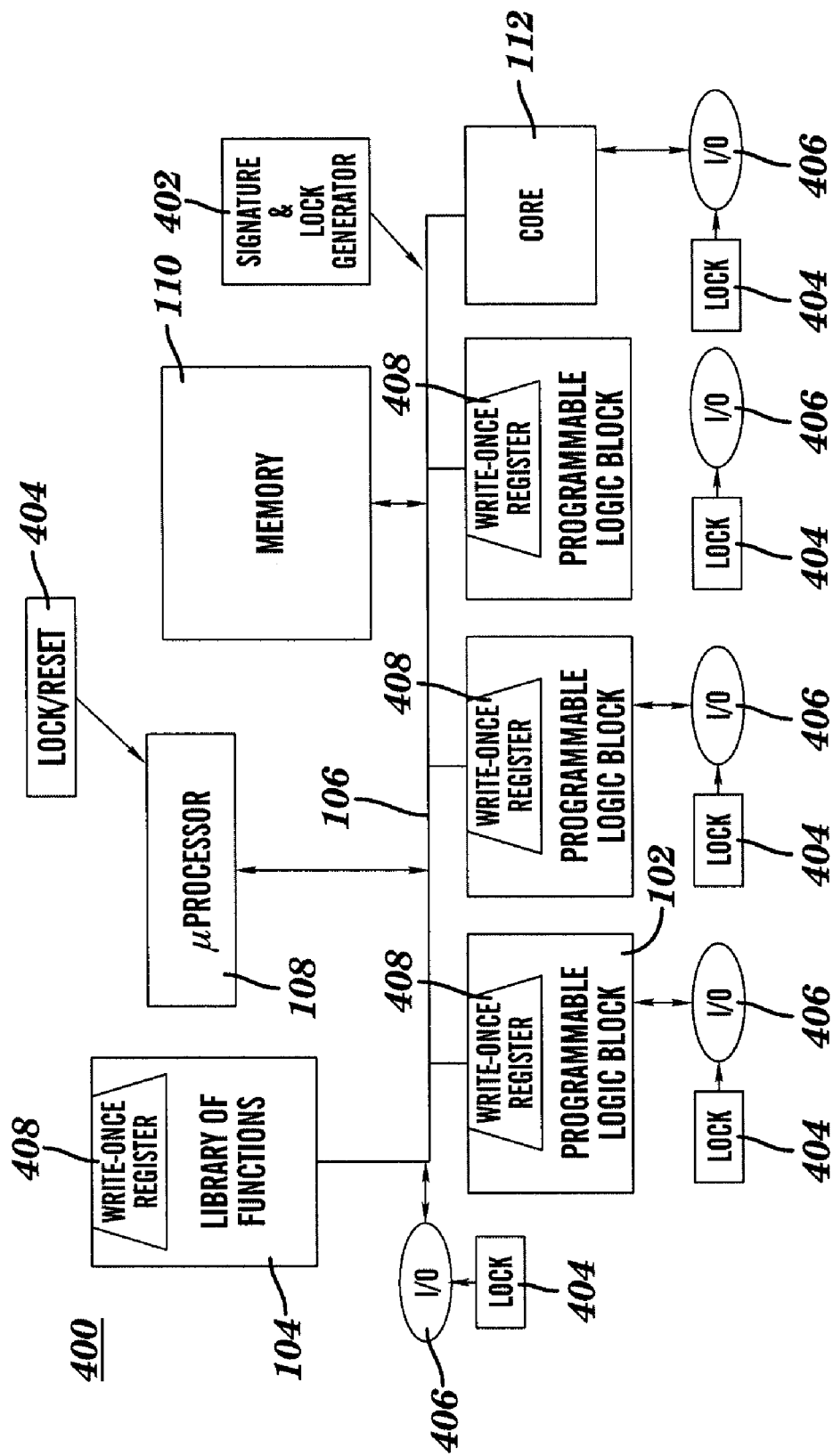
FIG. 4 is a block diagram illustrating an exemplary system incorporating a method for system level protection of field programmable logic devices, in accordance with an embodiment of the invention.

Referring now to FIG. 4, there is shown a block diagram illustrating an exemplary system 400 incorporating the present encryption scheme. As is shown, a signature/lock generator 402 in communication with the system level bus is configured to generate an encoding key and to then pass that key to the function library 104, as well as each of the programmable logic blocks 102. In order to ensure that the encoding key is not observable from any non-secure observer, a lock 404 is put on all outside resources 406 (e.g., external connections and microprocessor 108) and programmable bus members to prevent them from either interfering with or reading the key This allows the key to be passed from the generator 402 to the individual programmable logic blocks 102 and library 104 securely.

In one embodiment, the lock 404 is generated from the generator 402 upon a power-on reset, thereby locking all of the I/O and external connections. Furthermore, the generated lock would also place any processors, bridges and other possible snooping resources in a lock or reset condition. During this lock/reset condition, each of these resources would be required to maintain a non-bus intrusive status on their connection to the system bus 106.

After the lock/reset is obtained, the signature/lock generator 402 will then generate a random number key. The random number may be generated through any number of techniques known in the art, such as through a linear shift feedback register (LFSR), for example. It will be appreciated, however, that alternative key generation embodiments may include the use of multiple keys, combinations of keys with other authenticating information, such as specific time window data. More complex keys in this regard may be used to increase system robustness, thus making observation or random hacking more difficult. In any case, the secure random number key is sent across the system bus 106 to various programmable logic blocks 102 and the library 104, and is specifically stored within an associated write-once register 408. The write-once register 408 is a device that may only be written to once from reset, and the key data therein is not readable, observable or otherwise obtainable through other methods directed toward making the key accessible, except to the decoding logic.

Figure 5:
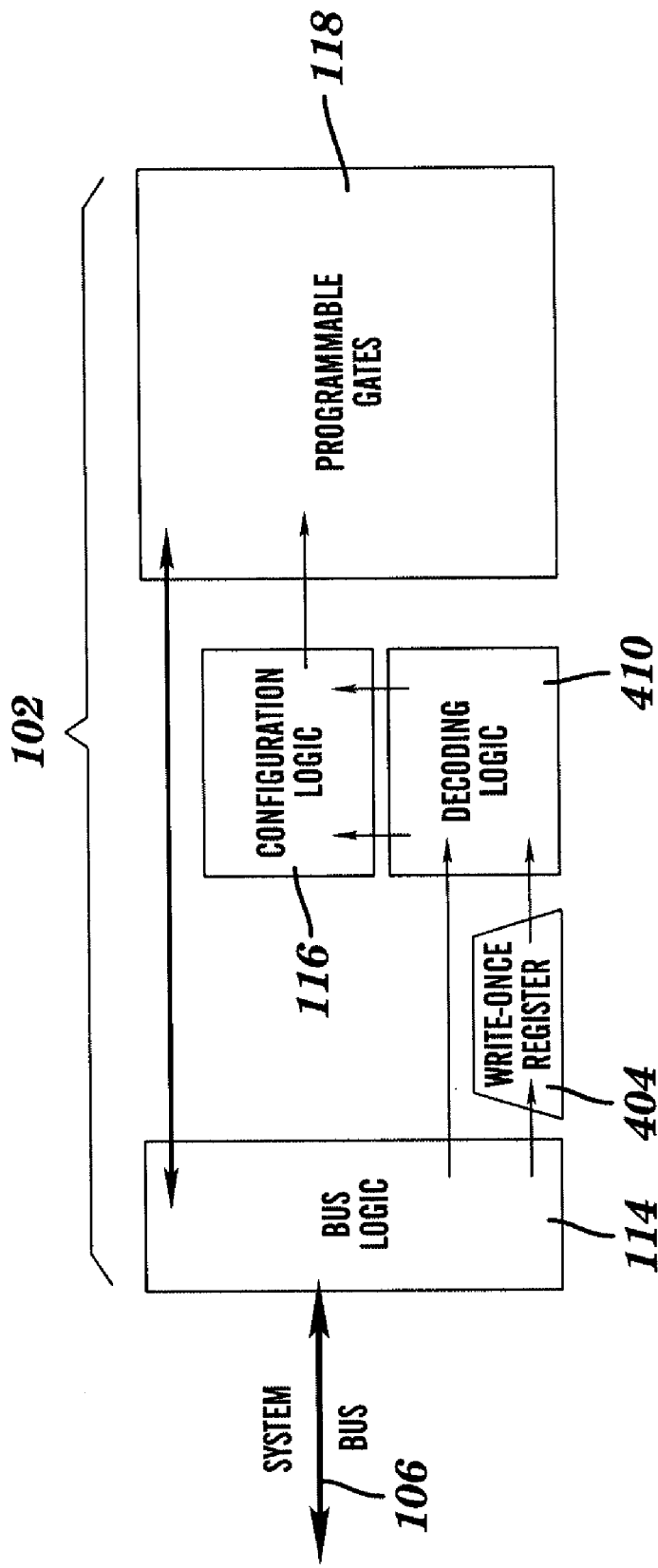
FIG. 5 is a block diagram of a programmable logic block configured in accordance with an embodiment of the invention, particularly illustrating the use of a write-once register and decoding logic.

The value of key data stored in the write-once registers is tied directly to encoding or decoding logic included within the programmable logic block or library. As is illustrated in FIG. 5, the system bus 106 is connected to the bus logic 104. Again, the bus logic 114 converts the data on the system bus 106 to useable data. If the data is the initial key, it is sent to the write-once register 404. On the other hand, if the data on the system bus 106 is configuration data, then the information is sent directly to the decoding logic 410 included within the programmable logic block 102. If the programmable logic block 102 is in a functional mode, then data is either passed from the system bus 106 into the programmable gates 118 or is read from the programmable gates 118 onto the system bus 106.

The library 104 is configured to encode the configuration information and to then pass this encoded information to the particular programmable logic block(s) 102. The configuration information contained within the library 104 is also protected, such as by storing the configuration data in ROM. In this manner, all of the actual configuration information is never seen, except as encoded on the system bus 106.

The encoding scheme used in the present embodiments may be implemented by any number of known systems. For example, a 128-bit key provides a large solution space and may be sufficient, depending of the specific application of the SOC. Further, the actual encoding scheme is preferably hardware amenable (i.e., is easily constructed from hardware). With the decoding in hardware, the security of the design is even more protected.

During PLB configuration, the data from the system bus 106 is decoded using the key from the write-once register 404. The decoded configuration data is thereafter used to configure the programmable gates 118. Because the write-once register 404 is only viewable from the decoding logic 410, an outside (bus) observer is therefore unable to view the data in the write-once register 404. Accordingly, once the data is decoded, it is used to program an SRAM (not shown) that controls the programmable logic gates 118. Once configuration is accomplished, the configuration logic is turned off, and information to/from the system bus 106 is passed directly to the programmable gates 118.

It should be noted that although the decoding logic 410 in FIG. 5 is depicted as being external with respect to the programmable gates 118, this need not be the case. In other words, the decoding logic may also be integrated in the programmable gates (i.e., the decoding logic is itself programmable).

As indicated previously, another function provided by the signature and locking generator 402 is the locking of external I/O (resource) access points to the system level bus and other components. This locking scheme may be implemented, for example, simply by utilizing an AND gate between the I/O (or other resource) 406 and the system bus 106. This function thus prevents an external system from reading the bus transactions that occur during the key passing, and is particularly desirable for systems providing a direct connection of the system bus to an off chip or off system.

Figure 6:
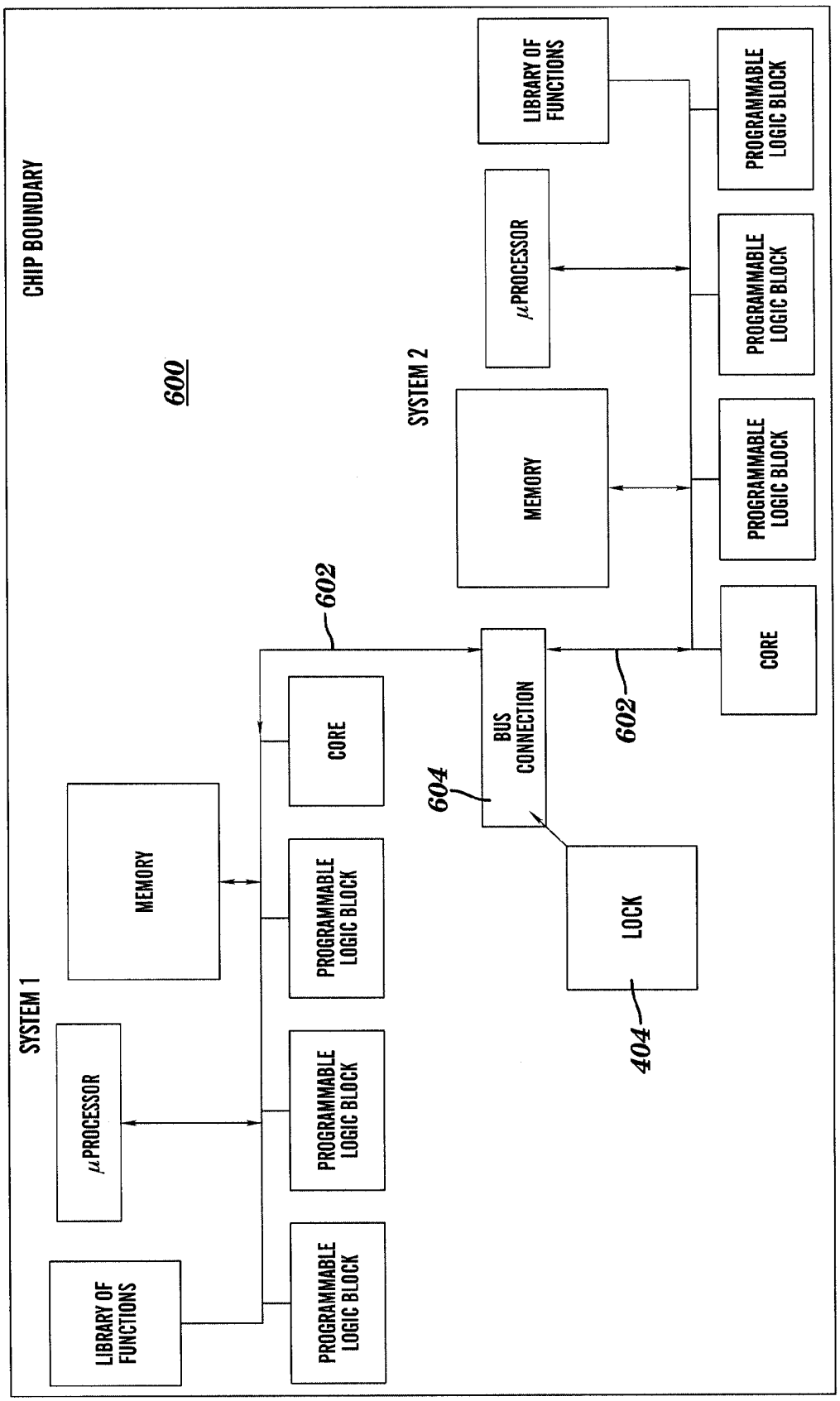
FIG. 6 is a block diagram of a chip having multiple systems included thereon, and which share a common system level bus, in accordance with a further embodiment of the invention.

Finally, in addition to isolating off chip/off system access during key generation and passing, it may also be desirable for multiple SOC implementations on a single chip to be isolated from one other during the key passing. This is illustrated by the block diagram shown in FIG. 6, in which a chip 600 includes a first system (system 1) and a second system (system 2) therein. Both systems share a common system level bus 602 having a bus connection 604 therebetween. In addition, the bus connection element 604 is provided with a lock 404 (as described earlier) so as to isolate the two systems from one another during the key passing While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for protecting a dynamically reconfigurable computing system, the method comprising:
   generating an encoding key;
   passing said encoding key, through a system level bus, to at least one field programmable logic device included within the system;
   passing said encoding key, through said system level bus, to a function library included within the system, said function library containing a plurality of functions for selective programming into said at least one field programmable logic device, wherein said encoding key is stored within a write-once register configured within said at least one field programmable logic device and said function library;
   generating a lock so as to prevent external resources with respect to the system from accessing said encoding key during said passing thereof, wherein said generating an encoding key and said generating a lock is implemented during a power-on reset of the system; and
   utilizing said encoding key for decoding configuration data sent from said library to said at least one field programmable logic device, wherein during a functional mode of operation, data is passed directly between said at least one field programmable logic device and said system bus.

2. The method of claim 1, wherein said write-once register is configured to be written thereto only during said power-on reset.

3. A method for protecting a dynamically reconfigurable computing system, the method comprising:
   generating an encoding key;
   passing said encoding key, through a system level bus, to at least one field programmable logic device included within the system;
   passing said encoding key, through said system level bus, to a function library included within the system, said function library containing a plurality of functions for selective programming into said at least one field programmable logic device, wherein said encoding key is stored within a write-once register configured within said at least one field programmable logic device and said function library;
   generating a lock so as to prevent external resources with respect to the system from accessing said encoding key during said passing thereof, wherein said generating an encoding key and said generating a lock is implemented during a power-on reset of the system; and
   utilizing said encoding key for decoding configuration data sent from said library to said at least one field programmable logic device, wherein the contents of said write-once register m said at least one field programmable logic device are viewable only by decoding logic configured within said at least one field programmable logic device.

4. The method of claim 3, wherein said write-once register is configured to be written thereto only during said power-on reset.

* * * * *